Aug. 27, 1968     P. J. M. O. SANCHEZ     3,398,704
SYSTEMS OF RETRACTION OF FOLDING ELEMENTS IN PIECES OF
FURNITURE, ESPECIALLY IN TABLES
Filed Oct. 26, 1966     8 Sheets-Sheet 1

INVENTOR
PASCUAL J.M. OSCOZ SANCHEZ
BY
ATTORNEY

Aug. 27, 1968 P. J. M. O. SANCHEZ 3,398,704
SYSTEMS OF RETRACTION OF FOLDING ELEMENTS IN PIECES OF
FURNITURE, ESPECIALLY IN TABLES
Filed Oct. 26, 1966 8 Sheets-Sheet 2
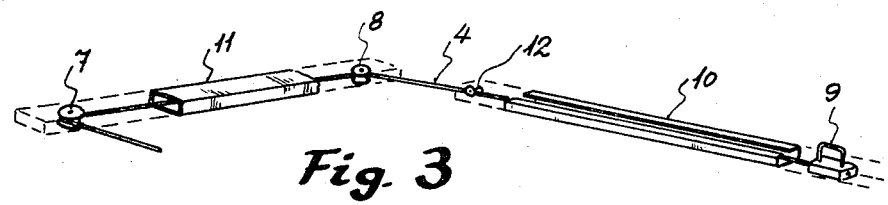
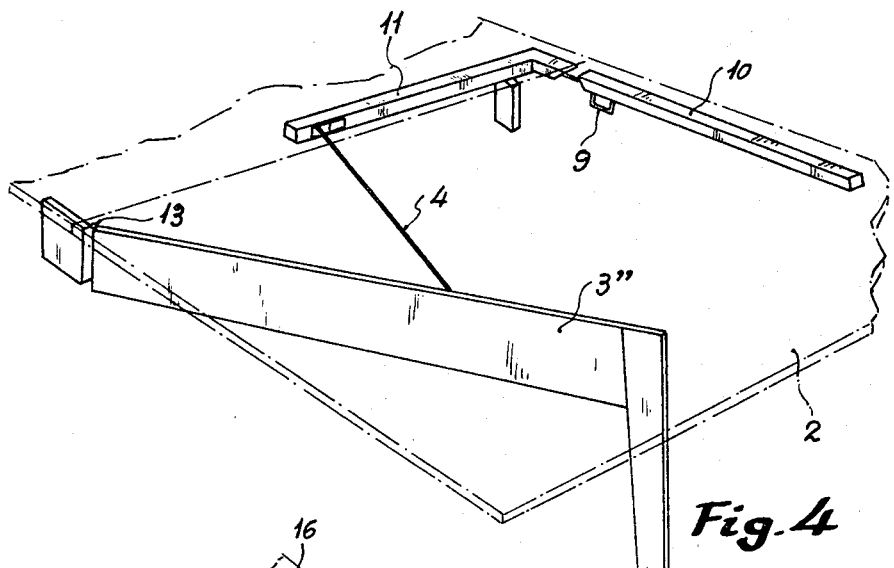
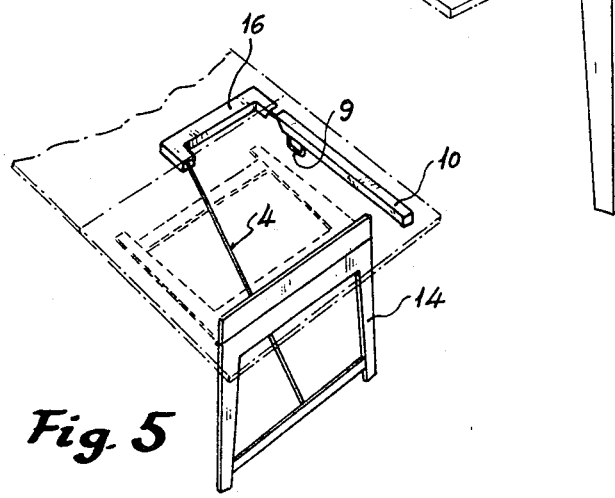
INVENTOR
PASCUAL J. M. OSCOZ SANCHEZ
BY
ATTORNEY Aug. 27, 1968    P. J. M. O. SANCHEZ    3,398,704
SYSTEMS OF RETRACTION OF FOLDING ELEMENTS IN PIECES OF
FURNITURE, ESPECIALLY IN TABLES
Filed Oct. 26, 1966    8 Sheets-Sheet 3

INVENTOR
PASCUAL J.M. OSCOZ SANCHEZ

BY *[signature]*
ATTORNEY

INVENTOR
PASCUAL J.M. OSCOZ SANCHEZ
BY
ATTORNEY

Aug. 27, 1968    P. J. M. O. SANCHEZ    3,398,704
SYSTEMS OF RETRACTION OF FOLDING ELEMENTS IN PIECES OF
FURNITURE, ESPECIALLY IN TABLES
Filed Oct. 26, 1966    8 Sheets-Sheet 7

INVENTOR
PASCUAL J.M.OSCOZ SANCHEZ

BY *[signature]*
ATTORNEY

INVENTOR
PASCUAL J. M. OSCOZ SANCHEZ
BY *Murie and Smiley*
ATTORNEY

United States Patent Office 3,398,704
Patented Aug. 27, 1968

3,398,704
SYSTEMS OF RETRACTION OF FOLDING ELEMENTS IN PIECES OF FURNITURE, ESPECIALLY IN TABLES
Pascual José María Oscoz Sanchez, Ibanez de Bilbao 6, Bilbao, Spain
Filed Oct. 26, 1966, Ser. No. 589,770
Claims priority, application Spain, Sept. 21, 1966, 331,454
4 Claims. (Cl. 108—79)

ABSTRACT OF THE DISCLOSURE

A concealed guide and cable arrangement for a folding top table for retracting the supporting leg structure for the foldable top portion. The operating mechanism is located in a guide fastened to the under surface of the folding top along one side edge thereof so as to be concealed but easily accessible.

Brief summary of the invention

The invention relates to folding top tables having supporting leg assemblies associated therewith and movable pivotally between extended and retracted positions. The folding top portion is provided on its under side and closely adjacent to one side edge with a guide track receiving an operating member having a depending handle and a flexible cable extends from this operating member through one end of the guide to pass beneath the fixed table top and generally parallel to the hinge connection in trained relationship with respect to guide mechanism and projects substantially centrally of the table to extend and to connect with the retractable support leg structure. In this way the operating member and the operating mechanism are concealed but the operating member and more particularly the handle is exposed for use in a convenient position to allow manipulation of the operating member to retract the supporting leg structure and allow the folding top to be placed in stored position.

In the said drawings:

FIGURE 3 shows in perspective the principal part of the transmission system applied to the forms of realization of the invention, in accordance with FIGURES 1 and 2.

FIGURE 4 shows in perspective a table of the type represented in FIGURES 1 and 2, in the unfolded position.

FIGURE 5 and 6 show in perspective two applications of the invention to a table equipped with a collapsible support framework.

Figure 13:
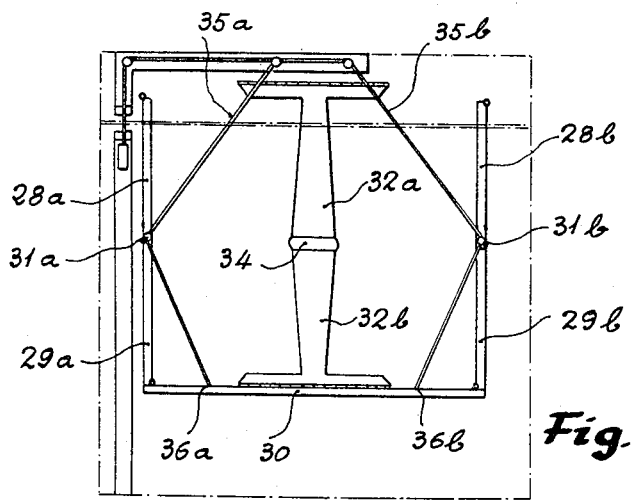
FIGURES 13 and 14 show in a manner similar to FIGURES 1 and 2 respectively variants of the application of the system to a folding table equipped with a support framework formed by five articulated elements, the folding framework being shown in its unfolded position by means of a continuous line.
Figure 13A:
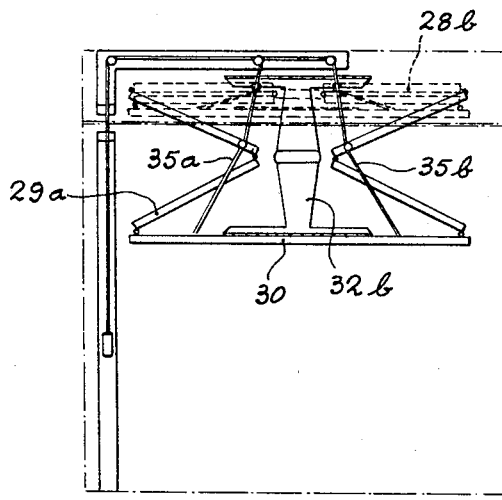
Figure 14:
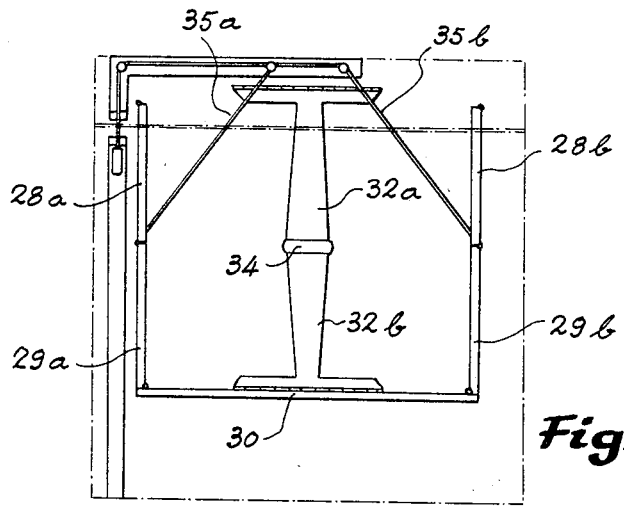
Figure 14A:
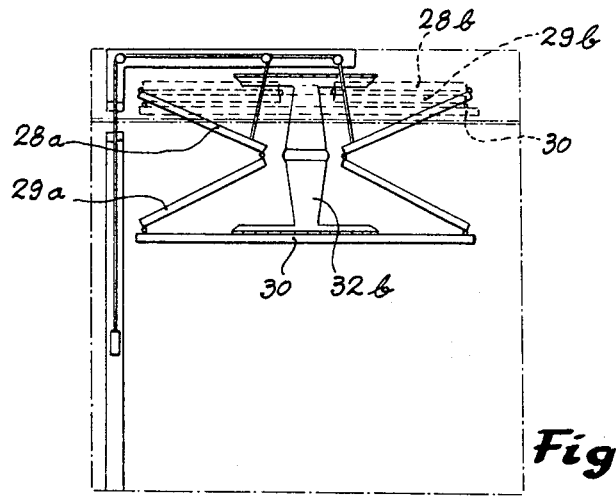

FIGURES 13a and 14a correspond to a representation similar to that of FIGURES 13 and 14 showing, in the form of a continuous line, the framework in a semi-folded position, and, in a broken line, the same framework completely folded.

Figure 15:
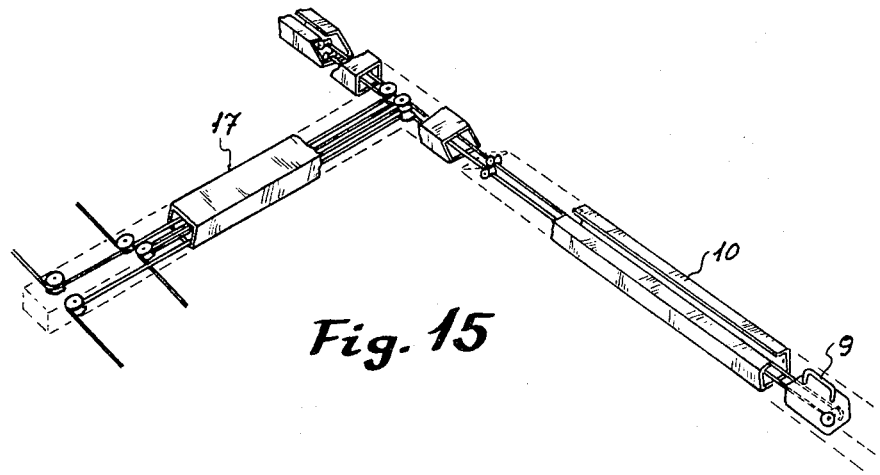

FIGURE 15 shows in perspective a transmission of movement suitable for the operation of the two leaves of a double table.

Figure 16:
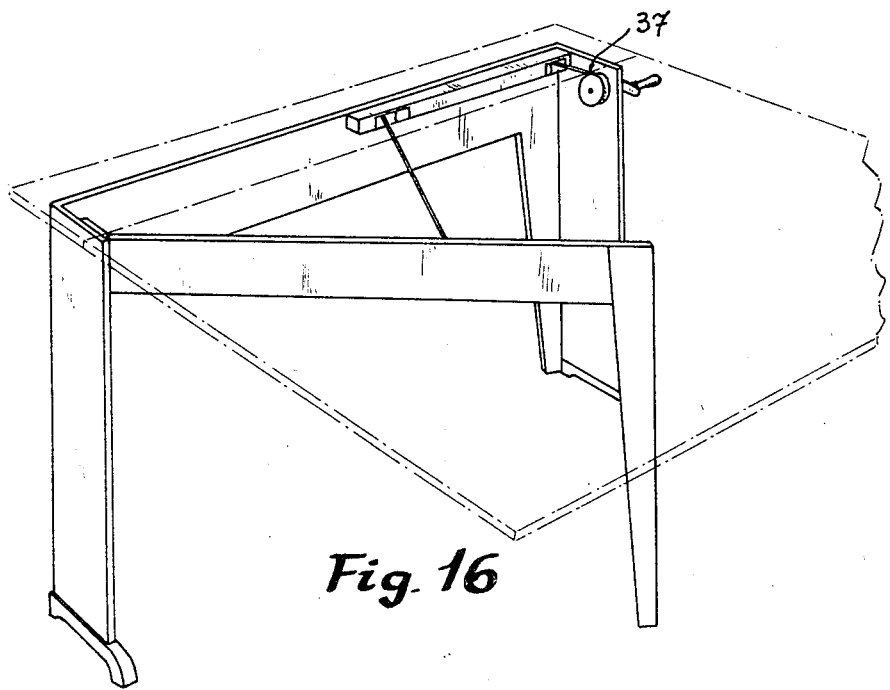

FIGURE 16 shows in perspective a detail of a variant of the operation of the system by means of the application of a drum.

Figure 1:
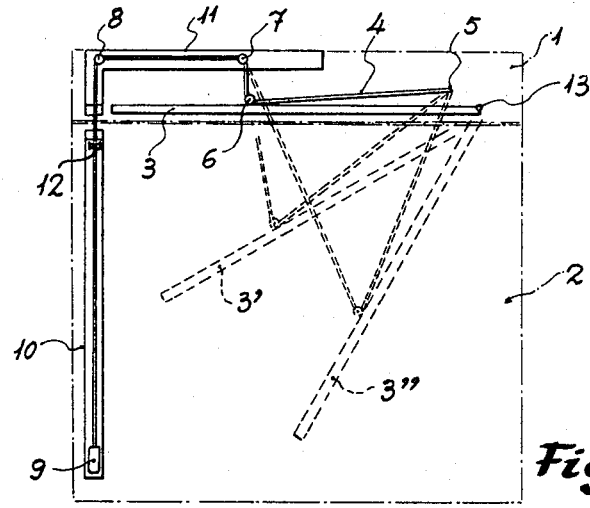
FIGURE 1 is a plan view of a table with a collapsible table-top, shown in the unfolded position, it being assumed that the table-top is transparent so that there may be better appreciated the system of retraction in accordance with one manner of realization of the invention.

As is shown in FIGURES 1, 3, and 4, in a case of especially simple application of the invention, the collapsible table consists of a table-top 2 articulated by one of its edges to the fixed table-top 1, which latter element forms part of a support framework composed of two fixed legs. To one of these legs the movable support framework 3 is articulated by means of the hinges 13 which have the feature of incorporating an elastic element in the form of a spring which forces the movable framework 3 to move towards the unfolded position 3″ in which the table is perfectly supported on three legs, two of which are fixed and the third is the movable leg of the framework 3.

Assuming that the invention is not applied to this type of table, the opening is effected automatically on lifting the table-top; this does not occur on folding the table, for which purpose it is necessary to raise the table-top and push the framework 3 to its folded position, shown by a continuous line in FIGURE 1.

The system of retraction in accordance with the invention consists in this case of application of a sliding element 10 formed by two guides between which there moves in a longitudinal direction the control 9. This control has fixed to it the end of a ribbon, cord, cable or chain, in general terms of a flexible and inelastic element 4, which guided by the pulleys 12, 8 and 7, fitted on the tubular support 11, passes through the pulley 6 fitted on the upper part of the movable framework and finally has its end fixed to the catch 5 fixed to the part 1.

Consequently, assuming that the table is in a folded position, on raising the table-top 1 the fixed framework successively occupies the positions 3′ until it reaches the limiting position 3″, which does it automatically because of the impulse due to the force accumlated by the elastic means incorporated in the hinges 13. During this movement the sliding element moves until it is situated near the joint.

To fold the table it suffices to lift the table-top and move the sliding element 9 manually to its limiting position, the table-top being finally collapsed.

Figure 2:
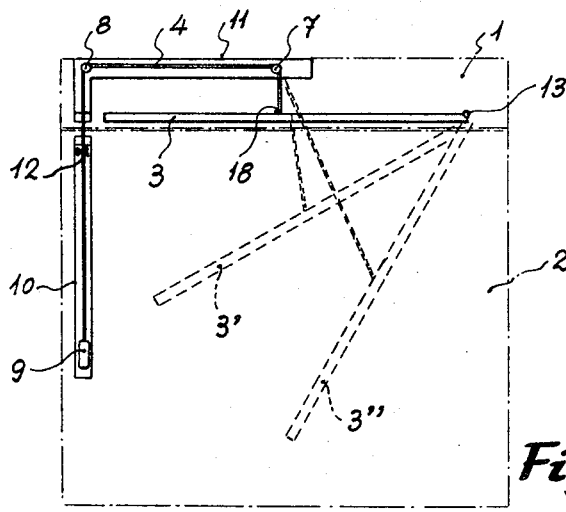
FIGURE 2 shows a table represented in a form similar to that of FIGURE 1, in accordance with another variant of the realization of the invention.

In the variant of application shown in FIGURE 2, the end of the flexible transmission 4 is fixed at 18 to the movable framework 3, the use of the pulley 6 thus being avoided.

In this variant of sliding element has a shorter distance to travel, and it is thus necessary to use greater force to move it.

Figure 6:
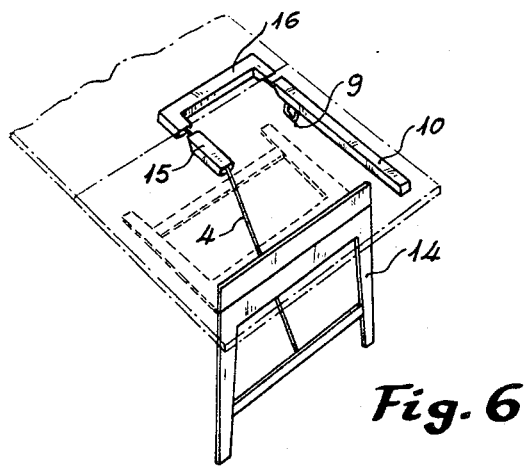

The same system of transmission, represented in detail in FIGURE 3, can be applied with a slight variation on adding a pulley with its axis of rotation situated in a horizontal position for the operation of the collapsible support frameworks as is represented in FIGURES 5 and 6.

In the case of FIGURE 5, the support framework 14 is articulated to the collapsible table-top itself. The sliding element 10 is also fixed to the said table-top, while the tubular covering of the means of transmission 16 is fixed to the fixed part of the table. The end of the cable is fixed to the lower part of the framework 14 so that, on the table being unfolded, the support framework is automatically situated in its vertical position, and on the sliding element 9 being pulled the said framework is raised in order to be folded. In FIGURE 6 there is included the guide element 15, equipped with two pulleys which enable the traction to be effected more efficiently.

Figure 7:
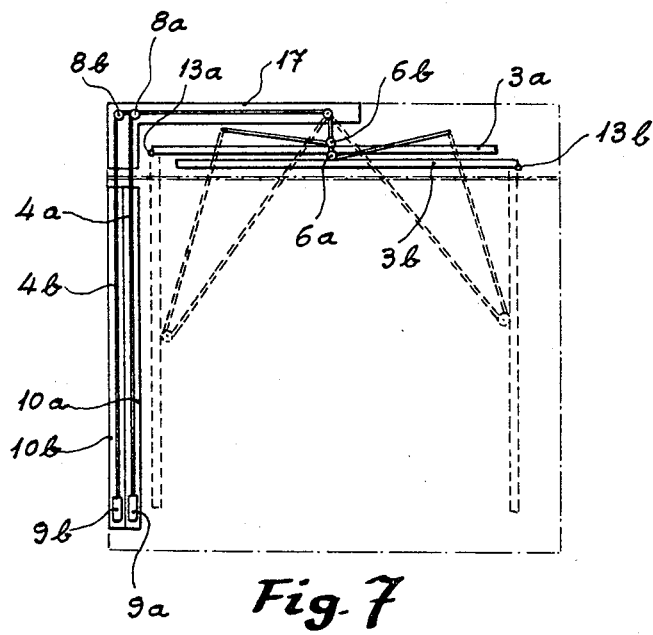
FIGURES 7 and 8 show, as in the case of FIGURES 1 and 2, two variants of application of the invention to a table equipped with two collapsible support frameworks.
Figure 8:
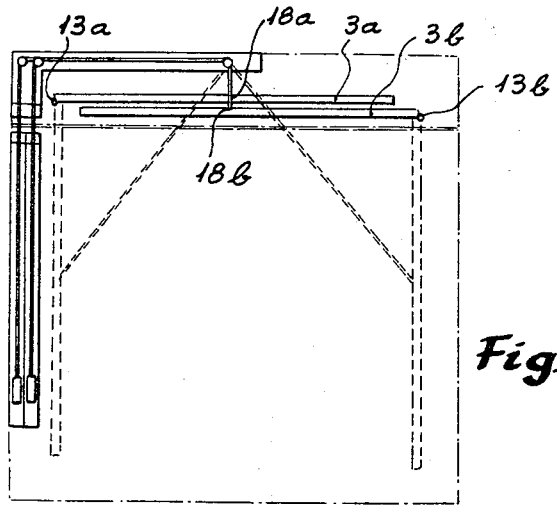

In the variant of realization shown in FIGURES 7 and 8, the table is constituted, with regard to the collapsible table-top and fixed support framework, in a form similar to that represented in FIGURES 1 and 2, but the movable or folding framework is a double one, since the table has four legs, there thus existing two movable frameworks 3a and 3b articulated to the fixed framework by means of the hinges 13a and 13b, both of which are also equipped with elastic means of expansion.

In the case of FIGURE 7, the system of operation and transmission for the movement of retraction of both frameworks is constituted by two parallel sliding elements 9a and 9b which slide between the two guides 10a and 10b, the ends of the respective ribbons, cables, chains or cords 4a and 4b being fixed to the corresponding sliding elements 9a and 9b which pass through the pulleys 8a and 8b of the tubular support 17 so that after being guided by a set of two pulleys on a common shaft they pass through the respective pulleys 6a and 6b fitted on the respective frameworks 3a and 3b, the ends of the said flexible and inelastic means being finally fixed to the fixed framework in opposite positions, there thus resulting a double arrangement of that shown in FIGURE 1.

The closing or folding of the table is effected in a manner similar to that described in FIGURE 1, operating one and the other of the sliding elements.

In the realization shown in FIGURE 8, the double of FIGURE 2, the sliding element has to travel a shorter distance, as is the case in FIGURE 2, and so needs more force to be operated because of the end of the flexible means of transmission being fixed at the points 18a and 18b respectively of the frameworks 3a and 3b.

Figure 9:
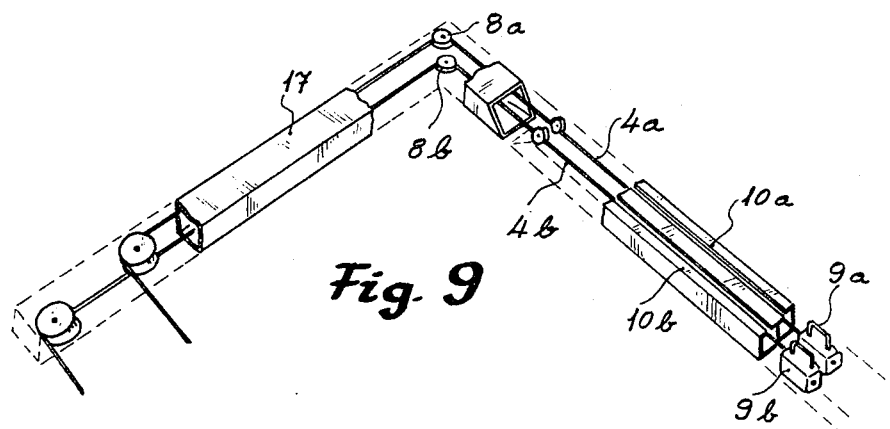
FIGURE 9 shows in perspective the principal part of the system of transmission of movement applied to the variants represented in FIGURES 7 and 8.

FIGURE 9 shows clearly the arrangement of the system of operation and transmission of two sliding elements.

Figure 10:
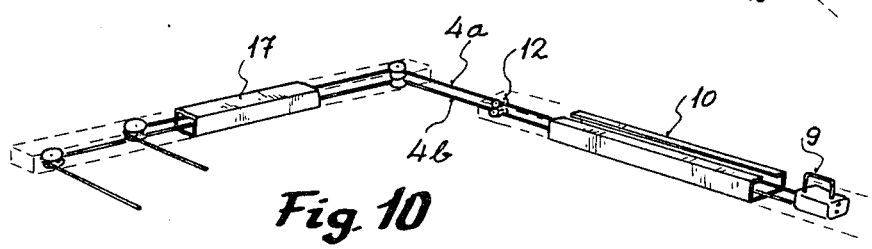
FIGURE 10 shows in perspective another variant of the system of transmission.

As is shown in FIGURE 10, the operation of the two parts may be made simultaneous by means of a single sliding element to which both means of transmission are fixed, the system in all other respects being similar to that shown in FIGURE 9.

Figure 11:
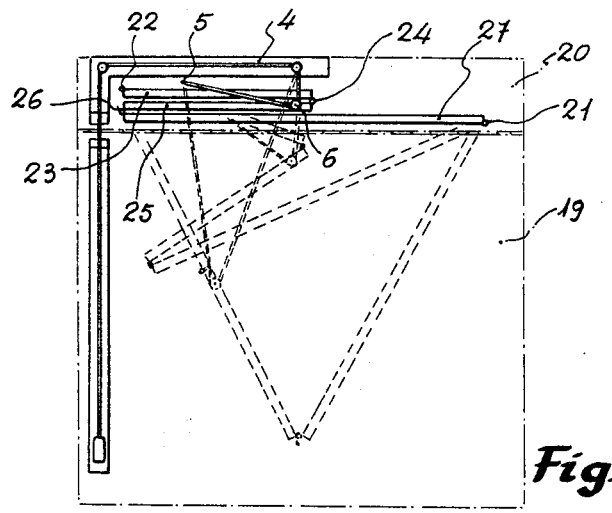
FIGURES 11 and 12 show, in a manner similar to that of FIGURES 1 and 2, respective variants of application of the system to a folding table equipped with a support framework of the type formed by three elements articulated with respect to one another.
Figure 12:
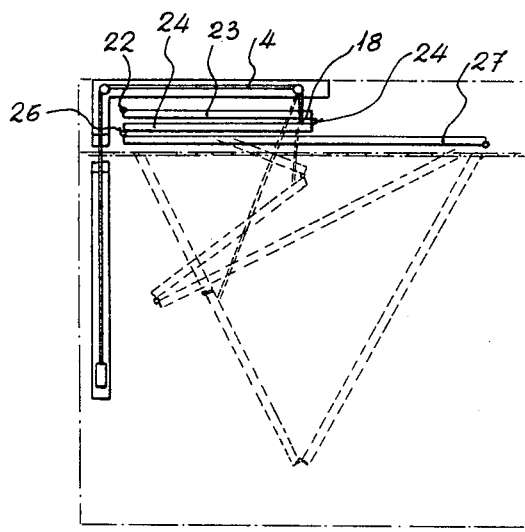

FIGURES 11 and 12 show a case of application of the invention to a table constituted by a support framework of three legs formed by three articulated sections, one of which, 27, corresponds to a lateral element, while the other lateral element is formed by the two articulated parts 23 and 25, the first-named element collapsing on the said two parts which constitute the second frame support. The table includes, as in previous realizations, a fixed part 20 and the collapsible table-top 19.

The hinges or joints 21, 22, 24 and 26 are equipped, totally or in part, with the corresponding elastic means which produce the force necessary for the automatic unfolding.

In the realization shown in FIGURES 11 and 12 the element transmitting force for the folding of the support frame is fixed at 5 to the fixed structure of the table, not represented, and passes through the pulley 6 and two pulleys fixed to the said fixed structure of the table, ending in a sliding element of the type previously shown.

The unfolding is effected in the manner indicated by broken lines in FIGURE 11, that is to say that there is no substantial variation with respect to the previous figures except in connection with the different structure of the support frame.

In FIGURE 12 there is shown, as a variant of the previous figure, an arrangement of the force transmitting elements similar to that represented in FIGURE 2, that is to say that the flexible means of transmission of force is fixed at 18 to the intermediate section of the structure so that on the sliding element being pulled the whole complex folds. As in FIGURE 2, the distance travelled by the sliding element is less than in FIGURE 11.

In FIGURES 13 and 14 another type of folding support structure for the table is shown, which is also articulated to the fixed part of the said table.

In this latter case the support structure includes two lateral elements formed by the two articulated members 28a and 29a, and 28b and 29b, of which 29a and 29b are articulated to the common member 30, while the members 28a and 28b are articulated to the fixed part of the table. All the articulations referred to are of the normal type, that is to say without the incorporation of elastic means.

To produce automatic unfolding, the said folding support frame presents the complex formed by the two arms 32a and 32b, articulated with respect to one another by means of the hinge 34 which has incorporated in it the spring for the storage of the force intended for the automatic opening when the said arms, forming a V, collapse, the one on the other, on their respective ends being articulated on the fixed part of the table and on the member 30.

In FIGURES 13 and 13A, the tractor element necessary for the folding of the support structure is formed by the bands or cords 35a and 35b which pass through the corresponding pulleys 31a and 31b situated near the articulations between the members 28a–28b and 29a–29b, the ends being fixed at the points 36a and 36b of the part 30 in the most appropriate places so that the transmission of force may be effected in the best possible manner.

The said tractor element 35a and 35b pass through pulleys situated on the fixed part, and end in a common sliding element so that the whole of the operation is effected simultaneously, since the folding movements are totally symmetrical, as is shown by the broken line, by means of a transmission of the type shown in FIGURE 10.

Insofar as FIGURES 14 and 14A are concerned, the variation consists of the fact that, as in previous examples, the end of the transmission element is fixed to the folding structure, in this case near the point of articulation between the members 28a–29a, or 28b–29b, the travel of the common sliding element being less than that necessary for FIGURE 13, but consequently needing a greater force.

FIGURE 15 shows the arrangement of the elements of transmission and operation for their application to a table with two folding table-tops. In this case the only innovation consists in the doubling of the transmission system.

FIGURE 16 shows in detail a variant of the organ of operation, which in this case is a simple drum on which the transmission element is rolled. The said drum 37 has elastic means incorporated in it, for example a spiral spring, in order to obtain a determined tension in the means of transmission.

It is evident that further variants of the present invention are possible, both as regards the arrangement of the organs of guidance and transmission and the means of control or operation, but in all cases the invention presents a control element which moves in a linear or a rotatory direction, by means of which element a flexible and inelastic transmission element is brought into play and which acts on the most suitable places to effect the folding of the folding support framework of the table with a minimum of effort.

Likewise variations are possible with respect to material, form and arrangement, provided that such alterations do not suppose any substantial variation in the invention.

What I claim is:

1. A table construction comprising, in combination,
a fixed top having supporting legs and an end edge,
a movable top having an end edge hingedly secured to said end edge of the fixed top for movement between a downwardly folded position and a generally horizontal position,
support leg means for said movable top pivotally connected to said table for movement between a stored position allowing said movable top to hang freely in its stored position and an operative position supporting said movable top in the stated horizontal position effecting an extension of said fixed top,
said movable top also having a side edge,
an elongate guide member fixed to the under surface of said movable top adjacent and parallel to said side edge thereof,
a control member slidably engaged in said guide member and having a depending handgrip portion,
an elongate flexible member connected at one end to said control member,
guide means fixed to the under surface of said fixed top adjacent said end edge thereof,
said flexible member extending from said guide member to train over said guide means and extend parallel to said end edge of the fixed top and projecting generally centrally therefrom into connection with said support leg means.

2. The table construction according to claim 1 wherein said guide means comprises a tubular support fixed to the under surface of said fixed top parallel to said end edge thereof, and pulleys located within said tubular support.

3. The table construction according to claim 2 wherein said support leg means is of L-shaped configuration.

4. The table construction according to claim 2 wherein said support leg means includes a vertical leg structure, pairs of arms connected respectively to the fixed top and said leg structure and pivotally interconnected to each other for collapsing and extending said leg structure, and brace means comprising a pair of elements hingedly connected respectively to each other and to the fixed top and said leg structure.

References Cited

UNITED STATES PATENTS

| | | | |
|---|---|---|---|
| 1,262,272 | 4/1918 | Sellner | 108—79 |
| 1,516,323 | 11/1924 | Bilton | 108—79 |
| 1,623,850 | 4/1927 | Patenaude | 108—79 |
| 2,121,398 | 6/1938 | Dukes | 108—79 |
| 2,799,547 | 7/1957 | Larsen | 108—79 |
| 2,890,089 | 6/1959 | Oscoz Sanchez | 108—79 |
| 3,029,114 | 4/1962 | Oscoz Sanchez | 108—79 |

FOREIGN PATENTS

| | | |
|---|---|---|
| 4,667 | 1884 | Great Britain. |
| 724,641 | 2/1955 | Great Britain. |

FRANCIS K. ZUGEL, *Primary Examiner*.